Oct. 3, 1950   R. W. ANTHONY   2,524,507
CLAMPING DEVICE
Filed Feb. 7, 1945   2 Sheets-Sheet 1
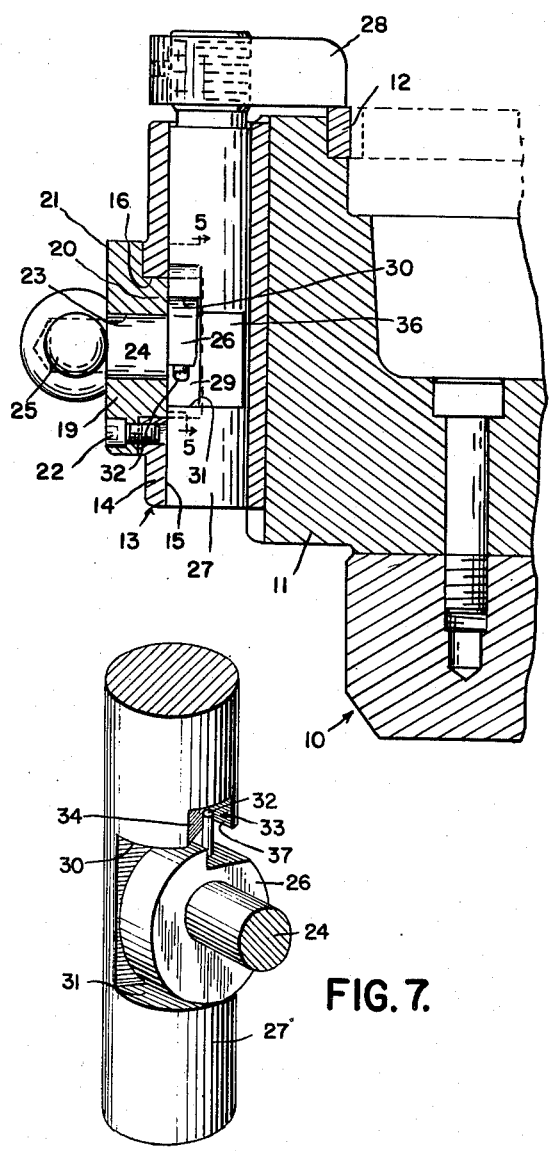
FIG. 1.
FIG. 7.
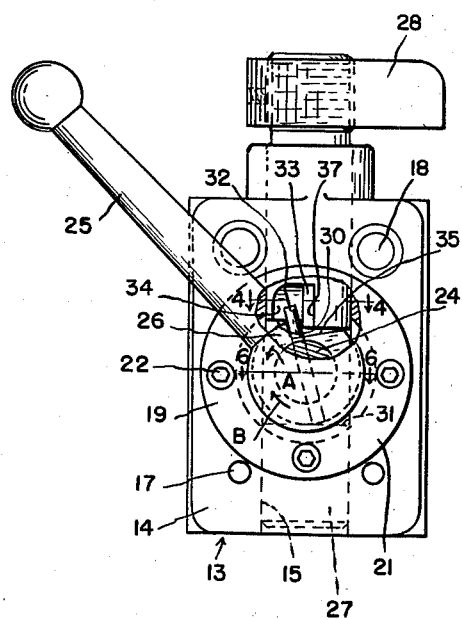
FIG. 2.
*INVENTOR.*
RUSSEL W. ANTHONY
BY
ATTORNEYS Oct. 3, 1950

R. W. ANTHONY 2,524,507

CLAMPING DEVICE

Filed Feb. 7, 1945

INVENTOR.
RUSSEL W. ANTHONY
BY
ATTORNEYS

Patented Oct. 3, 1950

2,524,507

UNITED STATES PATENT OFFICE 2,524,507

CLAMPING DEVICE

Russel W. Anthony, Detroit, Mich., assignor to National Broach and Machine Company, Detroit, Mich., a corporation of Michigan Application February 7, 1945, Serial No. 576,638

6 Claims. (Cl. 90—59)

This invention relates generally to work holding equipment and refers more particularly to improvements in clamping devices of the type used to secure work in position while being processed.

One of the principal objects of this invention is to provide a clamp composed of a relatively few simple parts capable of being inexpensively manufactured, assembled and installed on various different types of machines for rigidly holding the work in place while the latter is being processed.

Another object of this invention is to reduce the time required to set up the work on or remove the same from the machine by providing a quick acting clamp capable of being readily manipulated to work clamping and work releasing positions.

A further feature of this invention is to provide a work holding clamp having a work engaging member movable in opposite directions to respectively clamp and release the work and having means responsive to movement of the member into its work releasing position to move the member out of registration with the work and responsive to movement of the member to its work clamping position to move the member into registration with the work. This feature contributes materially to facilitating operation of the clamp to secure the work to and release the same from the machine table or other fixture.

The foregoing as well as other objects will be made more apparent as this description proceeds, especially when considered in connection with the accompanying drawings, wherein:

Figure 1 is a fragmentary sectional view showing one installation of a clamp constructed in accordance with this invention;

Figure 2 is a front elevation of the clamp shown in Figure 1;

Figure 7 is a fragmentary perspective view showing the means for both rotating and axially moving the shaft of the clamping member.

Figure 3:
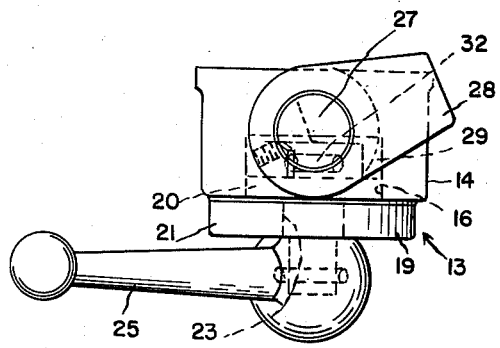
Figure 3 is a plan view of the clamp shown in Figure 2.
Figure 4:
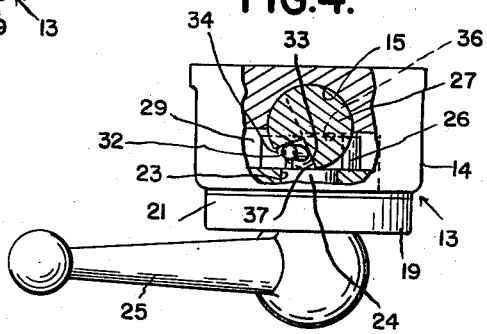
Figure 4 is a sectional view taken substantially on the line 4—4 of Figure 2.

One application of the clamp forming the subject matter of this invention is shown in Figure 1 of the drawings, although it will be apparent as this description proceeds that the clamp may be advantageously used in practically any installation where it is desired to clamp work parts in place for subsequent processing.

With the above in view, reference is now made in detail to Figure 1, wherein it will be noted that the reference character 10 indicates a part of the table of a suitable machine, 11 designates a fixture secured to the top of the table, 12 indicates a work piece positioned by the fixture 11 and 13 illustrates a clamp embodying the features of the present invention. The work piece 12 shown in Figure 1 is in the form of a ring and accordingly a plurality of clamps are required to secure the same to the fixture. However, since all of the clamps may be of identical construction, only one is shown in detail herein.

The clamp 13 comprises a body 14 preferably, although not necessarily, in the form of a casting having a vertical bore 15 therethrough and having an opening 16 in the front wall registering with the bore 15. The casting is adapted to be positioned on the fixture 11 by a pair of dowels 17 and is rigidly secured to the fixture by suitable screws 18.

The opening 16 through the front wall of the body 14 is closed by a cap 19 having a reduced cylindrical portion 20 adapted to fit in the opening 16 and having an enlarged radial portion 21 adapted to abut the surface of the front wall of the casting surrounding the opening 16. The cap 19 is rigidly secured to the body 14 by suitable screws 22 extending through the radial enlargement 21 on the cap and threadedly engageable in tapped openings formed in adjacent portions of the body. It will further be noted from Figure 1 that the cap 19 is formed with an axial bore 23 and an actuating shaft 24 is rotatably supported in the bore 23. A handle 25 is secured to the outer end of the shaft in a position to abut the front side of the cap 19 and a cam 26 is provided on the rear end of the shaft in a position to abut the rear side of the cap 19. In the present instance the cam 26 is formed integral with the shaft 24 and projects into the vertical bore 15. It will also be noted that the handle 25, shaft 24, cam 26 and cap 19 form a subassembly capable of being installed as a unit on the body 14.

Figure 5:
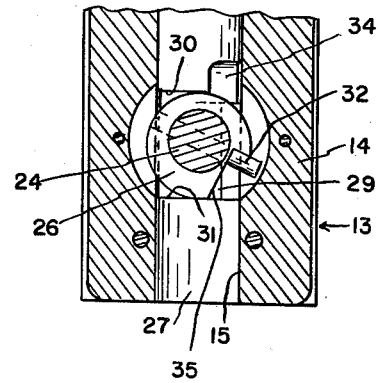
Figure 5 is a sectional view taken substantially on the line 5—5 of Figure 1.

A vertical clamping shaft 27 is mounted in the bore 15 for sliding and turning movement relative to the body 14. The upper end of the shaft projects above the body 14 and a work engaging member 28 is secured thereto. The intermediate portion of the shaft at the front side of the clamp is formed with a slot 29 shown in Figures 1 and 5 of the drawings as being of sufficient dimension to receive the cam 26. The top and bottom walls 30 and 31 respectively of the slot cooperate with the cam 26 to alternately raise and lower the shaft 27 upon rocking movement of the cam shaft 24 in opposite directions. The member 28 moves as a unit with the shaft 27 to clamp the work piece 12 to and to release the same from the fixture 11.

It is also desirable to swing the member 28 into and out of registration with the work piece 12 in timed relation to vertical movement of the shaft 27 to clamp and release the work. In the present instance the shaft 27 is rotated or turned in opposite directions about its axis by the cam 26 and pin 32 to swing the member 28 into and out of registration with the work piece 12.

Figure 6:
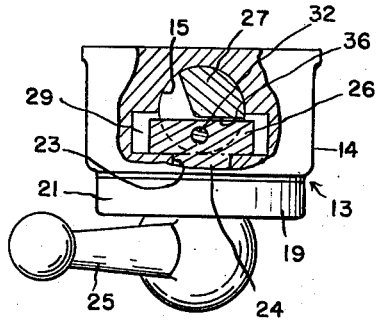
Figure 6 is a sectional view taken on the line 6—6 of Figure 2.

As shown in Figures 1, 2, 4 and 5 of the drawings, a pin 32 is extended radially through the cam 26 with one end projecting beyond the periphery of the cam. The projecting end of the pin 32 is positioned adjacent the high point of the cam and the shaft 27 is provided with a V-shaped slot 33 for receiving the projecting end of the pin when the cam 26 is rocked in the direction of the arrow A (Figure 2) towards its clamp releasing position. Continued rocking movement of the cam 26 in the direction of the arrow A engages the pin with the wall 34 of the slot 33 and rotates the shaft 27 in a direction to swing the member 28 out of registry with the work piece 12. In this connection attention is called to the fact that the periphery of the cam 26 is cut away adjacent the pin 32 to form a step 35 of sufficient dimension to provide the necessary clearance for surface 37 to swing over cam 26 in the position illustrated in Figure 2. Also it will be noted from Figure 6 that the portion 36 of the shaft opposite the cam 26 is cut away to enable the rotation of the shaft required to swing the member 28 out of registration with the work piece 12.

The clamp 13 is shown in Figure 2 in a position wherein the member 28 is swung out of registration with the work piece 12 and it will be noted from this figure that rocking movement of the cam 26 in the direction of the arrow B engages the pin 32 with the opposite wall 37 of the V-shaped slot 33 in the shaft to rock the shaft sufficiently to return the member 28 into registration with the work piece 12 before the cam 26 actually slides the shaft 27 downwardly to clamp the work piece 12 to the fixture 11.

Thus from the foregoing it will be noted that I have provided a relatively simple clamp wherein the work-engaging member 28 is swung out of registration with the work piece as it is released from the latter and is returned into registration with the work in response to movement thereof into clamping relation with the work. This feature is highly desirable in that it materially reduces the time required to secure a work piece to, and remove the same from, a work holding fixture.

What I claim as my invention is:

1. A clamping device comprising a work clamping member supported for sliding and rocking movement in opposite directions to work clamping and work releasing positions, a pair of shoulders on said member spaced from each other in the direction of sliding movement of the member, a cam supported between the shoulders for rocking movement about an axis perpendicular to the path of movement of the member and cooperating with the shoulders upon rocking movement in opposite directions to alternately slide the member to said work clamping and work releasing positions, means for rocking the cam in opposite directions, and means responsive to rocking movement of the cam in a direction to release the work to swing said member in one direction out of registration with the work and responsive to rocking movement of the cam in the opposite direction to clamp the work to return the member into registration with the work.

2. A clamping device comprising a clamping shaft having a laterally projecting work-engaging portion, means mounting said shaft for limited turning movement about its axis between a position in which said portion is in registry with a work piece and a position in which said portion is out of registry with a work piece, and for sliding movement axially of said shaft between work clamping and work releasing positions, said shaft having a pair of axially spaced transverse shoulders, and having a pair of circumferentially spaced, axially extending shoulders, an actuating shaft cooperating with said clamping shaft, a clamping cam carried by said actuating shaft received between the axially spaced shoulders of said clamping shaft to effect axial movement thereof, and a clamping shaft turning element movable through the space between said circumferentially spaced shoulders to effect turning movement of said clamping shaft.

3. A clamping device comprising a clamping shaft having a laterally projecting work-engaging portion, means mounting said shaft for limited turning movement about its axis between a position in which said portion is in registry with a work piece and a position in which said portion is out of registry with a work piece, and for sliding movement axially of said shaft between work clamping and work releasing positions, said shaft having a pair of axially spaced transverse shoulders, and having a V-shaped notch providing substantially radially disposed, circumferentially spaced, axially extending shoulders, an actuating shaft cooperating with said clamping shaft, a clamping cam carried by said actuating shaft received between the axially spaced shoulders of said clamping shaft to effect axial movement thereof, and a clamping shaft turning element movable through the space between said circumferentially spaced shoulders to effect turning movement of said clamping shaft.

4. A clamping device comprising a clamping shaft having a laterally projecting work-engaging portion, means mounting said shaft for limited turning movement about its axis between a position in which said portion is in registry with a work piece and a position in which said portion is out of registry with a work piece, and for sliding movement axially of said shaft between work clamping and work releasing positions, said shaft having a pair of axially spaced transverse shoulders, and having a pair of circumferentially spaced, axially extending shoulders, an actuating shaft cooperating with said clamping shaft, a clamping cam carried by said actuating shaft received between the axially spaced shoulders of said clamping shaft to effect axial movement thereof, and a clamping shaft turning element movable through the space between said circumferentially spaced shoulders to effect turning movement of said clamping shaft, said turning element and clamping cam being relatively positioned on said actuating shaft such that the clamping portion of said clamping shaft is moved sequentially from work clamping position to work releasing position to a position of non-registry with the work upon turning movement of said actuating shaft in one direction, and in reverse order upon movement of said actuating shaft in the other direction.

5. A clamping device comprising a clamping shaft having a laterally projecting work-engaging portion, means mounting said shaft for limited turning movement about its axis between a position in which said portion is in registry with a work piece and a position in which said portion is out of registry with a work piece, and for sliding movement axially of said shaft between work clamping and work releasing positions, said shaft having a first recess in one side thereof providing a pair of axially spaced transverse shoulders, and one of said transverse shoulders in turn having a second recess therein providing a pair of circumferentially spaced axially extending shoulders, a cam received between said transverse shoulders, to effect axial displacement of said shaft upon rotation of said cam, and a projection extending generally radially of said cam shaped to enter into said second recess to engage one or the other of said circumferentially spaced shoulders to effect rotation of said shaft upon rotation of said cam.

6. A clamping device comprising a clamping shaft having a laterally projecting work-engaging portion, means mounting said shaft for limited turning movement about its axis between a position in which said portion is in registry with a work piece and a position in which said portion is out of registry with a work piece, and for sliding movement axially of said shaft between work clamping and work releasing positions, said shaft having a first recess in one side thereof providing a pair of axially spaced transverse shoulders, and one of said transverse shoulders in turn having a second recess therein providing a pair of circumferentially spaced axially extending shoulders, a cam received between said transverse shoulders, to effect axial displacement of said shaft upon rotation of said cam, and a projection extending generally radially of said cam shaped to enter into said second recess to engage one or the other of said circumferentially spaced shoulders to effect rotation of said shaft upon rotation of said cam, said second recess and said projection being proportioned such that said projection will effect a predetermined rotation of said shaft, and pass out of said recess on continued rotation of said cam, whereby said shaft will be rotated only during a part of the rotation of said cam, the surfaces of said cam being shaped such that axial movement of said shaft results from rotation of said cam while said shaft is not rotating.

RUSSEL W. ANTHONY.

REFERENCES CITED

The following references are of record in the file of this patent:

UNITED STATES PATENTS

| Number | Name | Date |
|---|---|---|
| 641,886 | Planque | Jan. 23, 1900 |
| 1,263,652 | Davis | Apr. 23, 1918 |
| 1,624,609 | Maise | Apr. 29, 1927 |
| 1,805,443 | Walters et al. | May 12, 1931 |
| 1,862,850 | Fritschi | June 14, 1932 |
| 2,353,096 | Weidaner | July 4, 1944 |